United States Patent

Lange et al.

[11] Patent Number: 5,884,482
[45] Date of Patent: Mar. 23, 1999

[54] COMBUSTION ENGINE OF TURBOCOMPOUND TYPE WITH EXHAUST GAS BRAKE

[75] Inventors: Per Lange, Södertälje; Kjell Isaksson, Tullinge; Håkan Fransson, Björnlunda; Sigvard Orre; Rune Widlund, both of Södertälje, all of Sweden

[73] Assignee: Scania CV Aktiebolag, Sweden

[21] Appl. No.: 439,515

[22] Filed: May 11, 1995

[30] Foreign Application Priority Data

May 13, 1994 [SE] Sweden ................................. 9401651

[51] Int. Cl.$^6$ ...................................................... F02B 41/10
[52] U.S. Cl. ............................................................... 60/624
[58] Field of Search ................................ 60/624; 123/323

[56] References Cited

U.S. PATENT DOCUMENTS 4,748,812  6/1988  Okada et al. .
5,119,633  6/1992  Brooks et al. .
5,142,868  9/1992  Woon et al. ................................. 60/624

FOREIGN PATENT DOCUMENTS 0272680  12/1987  European Pat. Off. .

*Primary Examiner*—Michael Koczo
*Attorney, Agent, or Firm*—Ostrolenk, Faber, Gerb & Soffen, LLP

[57] ABSTRACT

The invention relates to a combustion engine 7 of compound type in which the exhaust gases partly drive a first turbine 3 for driving a compressor 4 for supplying and compressing combustion air, partly a second turbine 2 which, via a mechanical transmission 1 transmits the residual energy in the exhaust gases to the crankshaft 10 of the combustion engine. The exhaust gas brake 6 being placed downstream, in the exhaust gas flow direction, after the second power turbine 2 results in a greatly increased braking effect at a given limited permitted exhaust gas temperature. In corresponding conditions with regard to exhaust gas temperature and type of exhaust gas brake damper the braking effect extracted for compound engines can be improved by up to 27% compared with a conventional supercharged diesel engine.

7 Claims, 1 Drawing Sheet

5,884,482

COMBUSTION ENGINE OF TURBOCOMPOUND TYPE WITH EXHAUST GAS BRAKE

BACKGROUND OF THE INVENTION

The invention relates to a combustion engine of turbocompound type and, more particularly, to such an engine incorporating an exhaust gas brake preamble to patent claim 1.

A known means of improving the braking effect of a four-stroke combustion engine is to arrange an exhaust gas brake damper in the exhaust gas manifold outlet. Closing this exhaust gas damper will cause the engine to pump out exhaust gases during the exhaust stroke against the closed damper, thereby resulting in increased engine brake effect. In order inter alia to achieve a quicker brake effect response, endeavours have been made to place an exhaust gas brake damper as close as possible to the cylinder exhaust gas valves, preferably directly after the point where the cylinderwise exhaust gas branch ducts merge to form a common exhaust gas duct. In certain cases the damper may also be placed directly after a turbocharger where two or more separate exhaust gas manifolds lead exhaust gases to a turbine with two or more guiderails in the turbine, with the object of reducing pulsating noise on the exhaust gas side of the engine.

In connection with turbocompound engines, a number of solutions intended to increase the braking effect in turbocompound engines have been patented. For example, EP,B,272680 and U.S. Pat. No. 4,748,812 refer to solutions for engines with so-called Jake brakes. Such a brake provides engine braking by brief opening of exhaust gas valves at the end of the compression stroke. The known solutions mentioned use a special exhaust gas damper which is arranged between the supercharger turbine and the power turbine and closes the flow from the supercharger turbine at the same time as a throttled duct opens so that the power turbine can pump exhaust gases against a throttle at the same time as the power turbine transmission is reversed. This solution becomes technically complicated and expensive, involving a reversible gearbox with several gears. U.S. Pat. No. 5,119,633 refers to an alternative for engines with so-called Jake brakes whereby a simple bypass of the power turbine is activated as soon as engine braking is activated. Increased braking effect is thereby intended to be achieved by the power turbine driving power supplied to the crankshaft being largely disconnected because the flow through the power turbine ceases.

SUMMARY OF THE INVENTION

The object of the invention is to provide a greatly enhanced engine brake effect, particularly at high engine speeds, in a combustion engine of compound type, particularly in an engine which forms part of the drive unit for heavy trucks and buses. A second object is to be able to provide greater braking effect without the exhaust gas temperature becoming too high or the exhaust gas backpressure too great. A further object is to reduce at a given braking effect the temperature load and pressure load on the basic engine, thereby lengthening the service life of the basic engine, fuel injectors and seals and allowing longer engine brake activation periods without reaching excessive temperatures. Another object is to provide a high engine brake effect in a turbocompound engine with a technically simple and inexpensive system which requires no special reversible mechanical transmissions involving a multiplicity of gears or complicated waste gate arrangements.

The foregoing and other objects are achieved in accordance with the present invention by a combustion engine of the turbine compound type which includes a turbocharger turbine structured and arranged to receive exhaust gases from the engine, a power turbine structured and arranged to receive exhaust gases from the turbocharger turbine and an exhaust gas brake structured and arranged to receive exhaust gases from the power turbine.

Other features and advantages of the present invention will become apparent from the following description of the invention which refers to the accompanying drawings.

DETAILED DESCRIPTION OF THE PREFERRED EMBODIMENT(S)

Figure 1:
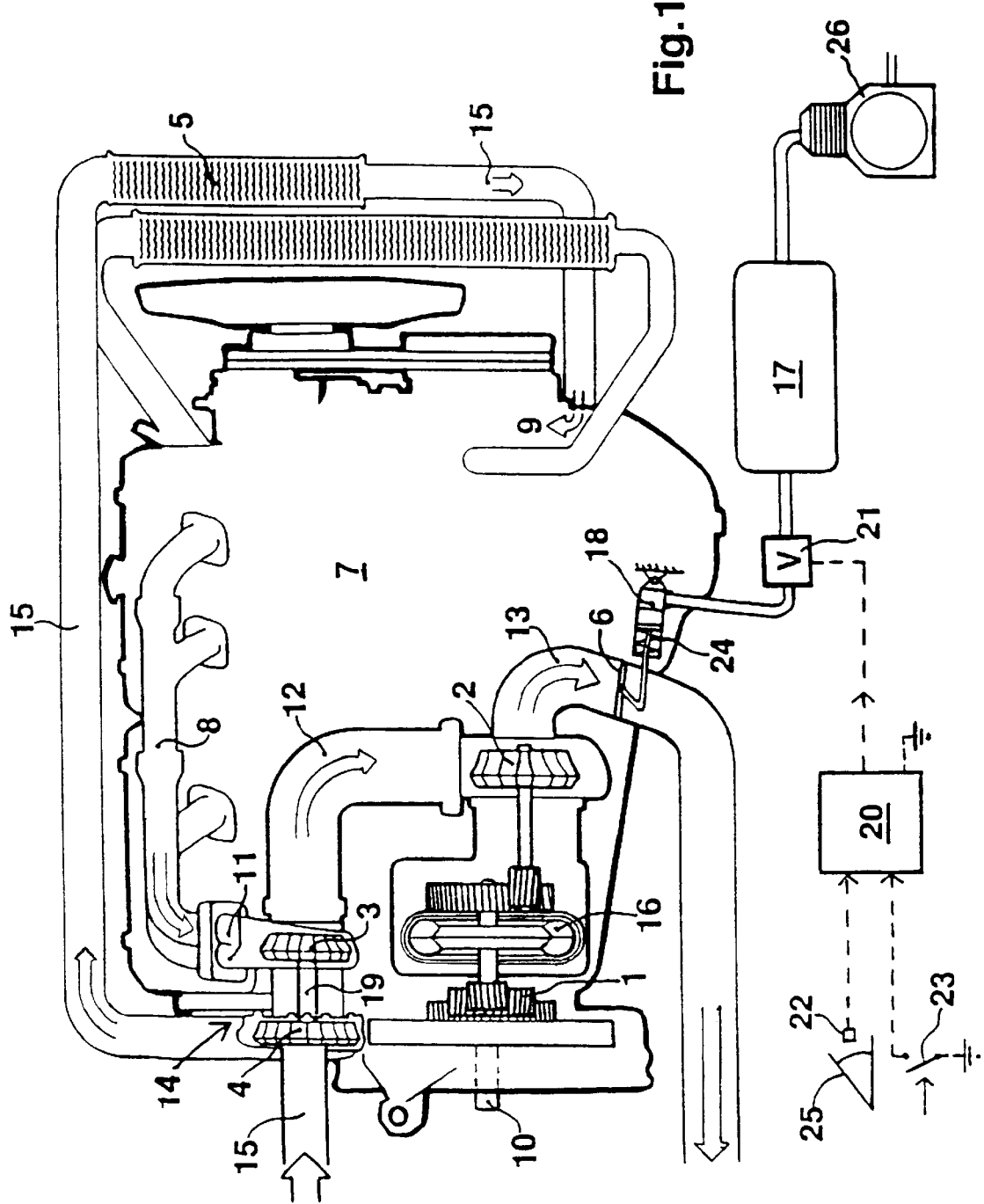
FIG. 1 shows schematically a combustion engine of turbocompound type in which the exhaust gas brake according to the invention is arranged downstream from the compound turbine.

FIG. 1 shows a combustion engine 7 of turbocompound type, preferably forming part of the drive unit for a heavy truck or bus. The engine is advantageously of the directly injected diesel type in which a supercharger 14, with turbine 3 driven by exhaust gases and compressor 4 arranged on the turbine shaft 19, is used for compressing and supplying combustion air. The inlet air passes in a conventional manner, represented by white arrows in the diagram, through inlet ducts 15, via not shown air filters, first to the compressor 4 and thereafter to the charging air cooler 5 before the resulting compressed and cooled air is supplied to the engine inlet branch pipe 9 (not shown). The exhaust gases from the engine are gathered first in an exhaust gas manifold 8 and then led, as shown by black arrows in the diagram, via a first exhaust gas duct 11, here a divided spiral inlet to the turbine 3, to the supercharger turbine 3 for driving the compressor. Thereafter the exhaust gases are led via a second exhaust gas duct 12 to a power turbine 2 and on conventionally via a third exhaust gas duct 13 to a not shown silencer and possibly to exhaust gas cleaning equipment. The power turbine 2 is used in turbocompound engines to extract residual energy from exhaust gases after they have passed through the supercharger turbine. The exhaust gases drive the power turbine at very high speeds, up to 60,000 rpm in the case of a normal engine speed, which for a diesel engine for heavy trucks is approximately 1400–2000 rpm. The resulting driving torque is transmitted to the crankshaft 10 of the combustion engine via a transmission 1 which steps the rotation speed down and which also advantageously incorporates a fluid clutch 16. The total efficiency of the drive unit may thus be improved by better utilisation of exhaust gas energy both for compressing the combustion air and for supplying a positive driving torque to the engine crankshaft. From a normal exhaust gas temperature in the exhaust gas branch pipe 8 of approximately 650° C., the temperature of the exhaust gases drops by approximately 150° C. as they pass through the turbocharger turbine 3 in both simple supercharged engines and compound engines, but in compound engines their temperature drops by a further 100°–110° C. as they pass through the power turbine 2, a fact which, combined with significant pressure drops through the turbines, means that a large amount of energy is utilised by the power turbine and supplied to the crankshaft of the combustion engine.

The feature distinguishing the invention is that a variable throttle, preferably an exhaust gas brake damper 6 in the form of a pivotably mounted flapper valve is arranged downstream from the power turbine 2 in the third exhaust gas duct 13 connected to the power turbine outlet. This positioning means that the exhaust gas volume gathered between the engine and the damper becomes relatively great, which is a definite advantage with regard to the response time for achieving full engine brake effect. At normal engine speeds, however, this exhaust gas volume is filled relatively quickly without any perceptible delay of the braking effect.

The exhaust gas damper 6 is designed so as to provide a gas tight seal in the closed position shown in FIG. 1, in which a servo with a predetermined closing force acts upon the damper. The servo may take the form of a pressure-controlled control cylinder 18 which may be pressurised by opening a control valve 21 connected to a pressure accumulator 17. On heavy duty vehicles, the pressure accumulator 17 may in a conventional manner form part of the compressed air system which is used inter alia for brakes and other equipment and which incorporates compressors 26 for maintaining a system pressure in the accumulator 17. Opening of the valve 21, which causes closure of the exhaust gas damper 6 against the action of a return spring 24 arranged in the control cylinder, is controlled via a control unit 20 in response to engine brake activation ordered by the vehicle driver, which may take place automatically after the driver has depressed a brake pedal 25 (this is detected via a brake pedal contact 22) or when the driver has operated a specific engine brake control 23.

This pressure control of a gas tight damper results in rapid filling and pressurisation of the exhaust gas volume situated between the engine and the exhaust gas damper, thereby causing rapid response and good engine brake effect even at low engine speeds with low air flow through the engine.

In another known case, the exhaust gas damper is often provided with a predetermined leakage gap with the object of limiting the maximum exhaust gas pressure. Such solutions have the disadvantages of slower response and poorer engine brake effect at low engine speeds. Leakage gaps also make it possible to use weaker valve springs for the engine exhaust gas valves without any risk of the exhaust gas pressure in the exhaust gas manifold becoming so high as to cause the exhaust gas valves to start opening, with consequent risk of the exhaust gas valves operating and opening at entirely incorrect times in the engine cycle.

In the solution according to the invention, however, it is advantageous that the exhaust gas damper provide a gastight seal at a predetermined closing force. This means that at the time of switching to engine braking with the exhaust gas damper closed the power turbine will start pumping exhaust gases against the exhaust gas damper, thereby maintaining downstream from the power turbine an exhaust gas pressure corresponding to the closing force. To this end, it is preferable that the exhaust gas damper be provided with a pivot eccentric to the exhaust gas duct 13 and that the larger half of the damper be directed downstream, whereby the larger half of the damper moves against the exhaust gas flow during the closing movement. Such an eccentric exhaust gas damper will thus open when the exhaust gas pressure becomes too great.

At the time of switching to engine braking, the power flow, which in normal operating circumstances without engine braking goes from the power turbine to the crankshaft, is reversed so as to go instead from the engine to the power turbine. This means that the hydraulic clutch 16 arranged in the power turbine transmission 1 develops a negative slip during engine braking instead of a positive slip. The slip is normally approximately 3–5%. In percentage terms the slip is defined as $100-(n_{pump}-n_{turb})/n_{pump}$, where $n_{pump}$ denotes the rotation speed of the hydraulic clutch half connected to the turbine and $n_{turb}$ the rotation speed of the hydraulic clutch half connected to the engine crankshaft.

Practical comparison between two identical six-cylinder eleven-liter diesel engines, one of which, hereinafter called the turbo engine, is provided only with a supercharger and the exhaust gas brake placed after the supercharger turbine outlet, while the other is a compound engine provided with a power turbine downstream from the supercharger turbine and the exhaust gas brake arranged downstream from the power turbine, shows that there is a substantially increased engine brake effect in the compound engine at a maximised permitted exhaust gas temperature. With the exhaust gas brake applied at full engine speed of approximately 2300 rpm, the compound engine can develop, without exceeding the permitted exhaust gas temperature, a braking effect which is almost 27% greater than the braking effect which the turbo engine can develop under corresponding conditions as regards exhaust gas temperature and type of exhaust gas brake. Tests show that on compound engines each degree Celsius by which the exhaust gas temperature is higher increases the braking effect by 0.60 kW, whereas the corresponding figure for turbo engines is approximately 0.45 kW. With regard to the exhaust gas pressure before the exhaust gas damper, tests show that in compound engines increasing the pressure by one (1) bar increases the braking effect by 43.5 kW, whereas the corresponding increase in turbo engines is approximately 34.6 kW. These results may be compared with the increase in braking torque which according to U.S. Pat. No. 5,119,633 applies to a bypassed power turbine in an engine controlled by a "Jake brake" as compared with a pure turbo engine. This more complicated engine with special arrangements for operating the exhaust gas valves during the closing phase of the compression cycle and with bypass-controlling arrangements on the power turbine is claimed to increase the braking torque by more than 25%. The simple arrangement according to the invention with the exhaust gas damper downstream from the power turbine, which preferably but not necessarily may omit bypass ducts, results in at least the same relative improvement in engine brake effect by significantly simpler means.

The reason why the exhaust gas brake throttle arranged downstream from the power turbine provides such a significantly increased braking effect at a given limiting permitted exhaust gas temperature is that the power turbine switches to being driven by the engine, thereby producing a number of effects. The first to occur is a braking torque on the crankshaft when the crankshaft switches to driving the power turbine as a pump in a compressorlike manner so that the exhaust gases are pumped against the exhaust gas damper. The power turbine in cooperation with the pressure-controlled gastight damper maintains a heightened exhaust gas pressure which is matched by the control pressure which keeps the exhaust gas damper closed. The fact that the power turbine is in principle adapted to being driven by the exhaust gases with maximum efficiency means that the reversed pumping function during exhaust gas braking will be performed with low efficiency. This is reflected in the formation of powerful turbulence which increases the temperature load on the power turbine. The pumping effect obtained from the power turbine does help, however, to increase the mass flow through the basic engine at a given braking effect, thereby reducing the temperature load on the basic engine and the engine cooling requirement.

For a given total braking effect, the exhaust gas brake positioning according to the invention has the effect that the temperature load on the basic engine falls below a certain degree of temperature load on the power turbine when the exhaust gas is applied, while the mass flow through the engine increases. This increased mass flow is partly due to the pumping effect obtained to a certain extent from the power turbine. The result is that the total braking effect can be increased, e.g. by increasing the controller pressure on the exhaust gas brake, so that the temperature of the exhaust gases leaving the engine reaches the same level as on a conventional supercharged engine with the exhaust gas brake placed after the supercharger turbine.

The total braking effect consists of two components, viz. the braking effect from the basic engine and the braking torque supplied to the crankshaft from the power turbine. These two components taken together thus result in a substantially greater braking effect at a given permitted temperature of the exhaust gases leaving the engine than the total braking effect obtainable with a conventional supercharged engine, with the exhaust gas brake placed after the supercharger turbine, in which the braking effect comes entirely from the basic engine.

In an alternative solution (not shown) the gastight damper is kept closed by a servo which cannot be acted upon by the exhaust gas pressure so that the damper opens, and instead the exhaust gas damper is controlled by a temperature control which detects the temperature of the exhaust gases in the exhaust gas manifold of the combustion engine. This solution does require, however, a very rapid response of the temperature sensor if a conventional exhaust gas damper is to be used. What is essential is that the temperature is not exceeded in the engine exhaust gas manifold, which temperature affects the injectors and gaskets of the engine.

Although the present invention has been described in relation to particular embodiments thereof, many other variations and modifications and other uses will become more apparent to those skilled in the art. It is preferred, therefore, that the present invention be limited not by the specific disclosure herein, but only by the appended claims.

We claim:

1. A combustion engine of the turbocompound type, which comprises:
   a turbocharger turbine structured and arranged to receive exhaust gases from the combustion engine;
   a power turbine structured and arranged to receive exhaust gases from the turbocharaer turbine; and
   an exhaust gas brake throttle structured and arranged to receive exhaust gases from the power turbine and to selectively throttle the exhaust gases received from the power turbine to selectively brake the combustion engine.

2. A combustion engine of the turbocompound type, which comprises:
   an exhaust gas manifold coupled to the combustion engine for receiving exhaust gases therefrom;
   a turbocharger turbine;
   a first exhaust gas duct connected from the exhaust gas manifold to the turbocharger turbine for delivering the exhaust gases thereto;
   a compressor for receiving and compressing combustion air supplied to the engine, the compressor being driven by the turbocharger turbine;
   a power turbine;
   a second exhaust gas duct connected from the turbocharger turbine to the power turbine for delivering the exhaust gases from the turbocharger turbine to the power turbine;
   a transmission driven by the power turbine and connected to a crankshaft of the combustion engine;
   a third exhaust gas duct connected to the power turbine for receiving the exhaust gases therefrom; and
   an exhaust gas brake throttle arranged in the third exhaust gas duct and operable between an open position in which the exhaust gases may pass to an outlet of the third exhaust gas duct, to prevent exhaust braking of the engine, and to a closed position in which the exhaust gases are blocked from passing to the outlet, to exhaust gas brake of the engine takes place.

3. A combustion engine in accordance with claim 2, wherein the exhaust gas brake throttle is a pivotably mounted flapper valve.

4. A combustion engine in accordance with claim 3, wherein the transmission is mechanical and includes a hydraulic clutch which can absorb any speed differences between the power turbine and the crankshaft.

5. A combustion engine in accordance with claim 4, wherein the turbocharger turbine is mounted on a shaft and the compressor is mounted on the same shaft.

6. A combustion engine in accordance with claim 2, wherein the exhaust gas brake throttle in the closed position is structured and arranged relative to the third exhaust gas duct such that a substantially gastight seal is formed therebetween.

7. A combustion engine of the turbocompound type, which comprises:
   an exhaust gas manifold coupled to the combustion engine for receiving exhaust gases therefrom;
   a turbocharger turbine;
   a first exhaust gas duct connected from the exhaust gas manifold to the turbocharger turbine for delivering the exhaust gases thereto;
   a compressor for receiving and compressing combustion air supplied to the engine, the compressor being driven by the turbocharger turbine;
   a power turbine;
   a second exhaust gas duct connected from the turbocharger turbine to the power turbine for delivering the exhaust gases from the turbocharger turbine to the power turbine;
   a transmission driven by the power turbine and connected to a crankshaft of the combustion engine;
   a third exhaust gas duct connected to the power turbine for receiving the exhaust gases therefrom;
   an exhaust gas brake throttle arranged in the third exhaust gas duct and operable between an open position in which the exhaust gases may pass to an outlet of the third exhaust gas duct to prevent exhaust braking of the engine, and to a closed position in which the exhaust gases are blocked from passing to the outlet to exhaust gas brake the engine, the exhaust gas brake throttle in the closed position being structured and arranged relative to the third exhaust duct such that a substantially gas tight seal is formed therebetween; and
   a servo mechanism for holding the exhaust gas brake throttle in the closed position, the exhaust gas brake throttle being structured and arranged such that the exhaust gas brake throttle is operated to its open position if the exhaust gas pressure in the third exhaust gas duct exceeds a predetermined level.

* * * * *